United States Patent
Liu

(10) Patent No.: US 11,967,006 B2
(45) Date of Patent: Apr. 23, 2024

(54) SYSTEMS AND METHODS FOR GENERATING ROAD MAP BASED ON LEVEL OF NODES AND TARGET LINKS

(71) Applicant: BEIJING DIDI INFINITY TECHNOLOGY AND DEVELOPMENT CO., LTD., Beijing (CN)

(72) Inventor: Zhidan Liu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 884 days.

(21) Appl. No.: 16/998,037

(22) Filed: Aug. 20, 2020

(65) Prior Publication Data

US 2020/0380742 A1    Dec. 3, 2020

Related U.S. Application Data

(63) Continuation of application No. PCT/CN2018/078832, filed on Mar. 13, 2018.

(51) Int. Cl.
| | |
|---|---|
| *G06T 11/00* | (2006.01) |
| *G01C 21/00* | (2006.01) |
| *G06T 11/20* | (2006.01) |
| *G08G 1/0969* | (2006.01) |

(52) U.S. Cl.
CPC .......... *G06T 11/20* (2013.01); *G01C 21/3815* (2020.08); *G08G 1/0969* (2013.01)

(58) Field of Classification Search
CPC .... G06T 11/20; G01C 21/3815; G08G 1/0969
See application file for complete search history.

(56) References Cited

U.S. PATENT DOCUMENTS

| | | |
|---|---|---|
| 7,526,492 B2 | 4/2009 | Mikuriya et al. |
| 8,131,466 B2 | 3/2012 | Iwatani |
| | (Continued) | |

FOREIGN PATENT DOCUMENTS

| | | |
|---|---|---|
| CN | 102610111 A | 7/2012 |
| CN | 104077326 A | 10/2014 |
| | (Continued) | |

OTHER PUBLICATIONS

The Extended European Search Report in European Application No. 18909466.7 dated Sep. 27, 2021, 10 pages.

(Continued)

*Primary Examiner* — Pakee Fang
(74) *Attorney, Agent, or Firm* — METIS IP LLC

(57) ABSTRACT

Systems and methods for generating a road map are provided. The methods include obtaining a navigation route for a navigation terminal and a current location of the navigation terminal. The methods further include obtaining road network data associated with the current location of the navigation terminal based on the navigation route and the current location of the navigation terminal. The road network data includes a plurality of links and a plurality of nodes. Each node is connected to one or more links including at least one type of links. The methods further include determining a level for each node. The methods further include determining one or more target links for the at least one type of links connected to the node based on the level of the node. The methods further include generating a road map based on the target links.

17 Claims, 15 Drawing Sheets

(56) References Cited

U.S. PATENT DOCUMENTS

| | | |
|---|---|---|
| 8,326,529 B2 | 12/2012 | Kang |
| 2007/0150185 A1 | 6/2007 | Nagase et al. |
| 2007/0250264 A1 | 10/2007 | Sekine et al. |
| 2007/0276709 A1 | 11/2007 | Trimby et al. |
| 2010/0153007 A1* | 6/2010 | Crowley ............ G01C 21/3889 701/467 |
| 2010/0312472 A1 | 12/2010 | Hilbrandie et al. |
| 2014/0336918 A1 | 11/2014 | Wan |
| 2015/0149078 A1 | 5/2015 | Profous et al. |
| 2016/0273928 A1 | 9/2016 | Rauch et al. |
| 2016/0305793 A1 | 10/2016 | Osawa |
| 2017/0010110 A1* | 1/2017 | Tashiro ............... G06F 16/9027 |

FOREIGN PATENT DOCUMENTS

| | | |
|---|---|---|
| CN | 103235848 B | 3/2016 |
| CN | 105865466 A | 8/2016 |
| CN | 104075729 B | 2/2017 |
| CN | 106767873 A | 5/2017 |
| CN | 107782323 A | 3/2018 |
| EP | 1643214 A2 * | 4/2006 ........... G01C 21/367 |
| EP | 1643214 A2 | 4/2006 |
| JP | 2004333377 A | 11/2004 |
| JP | 2017009618 A | 1/2017 |
| TW | 201231927 A1 | 1/2011 |
| WO | 0034874 A1 | 6/2000 |

OTHER PUBLICATIONS

Notice of Reasons for Rejection in Japanese Application No. 2020-548762 dated Aug. 10, 2021, 7 pages.
International Search Report in PCT/CN2018/078832 dated Nov. 29, 2018, 4 pages.
Written Opinion in PCT/CN2018/078832 dated Nov. 29, 2018, 4 pages.

* cited by examiner

SYSTEMS AND METHODS FOR GENERATING ROAD MAP BASED ON LEVEL OF NODES AND TARGET LINKS

CROSS REFERENCE TO RELATED APPLICATIONS

This application is a Continuation of International Application No. PCT/CN2018/078832 filed on Mar. 13, 2018, the entire contents of which are hereby incorporated herein by reference.

TECHNICAL FIELD

The present disclosure generally relates to systems and methods for providing an on-demand service, and in particular, to systems and methods for generating a road map.

BACKGROUND

Many location-based services and/or applications, such as web mapping services and navigation services, need a road map, especially an electronic road map. However, when a user accesses an electronic road map for navigation, sometimes the map shows excessive amount of information, including some interference information such as irrelevant roads, that might distract the user from properly processing the navigation results. Accordingly, it is desirable to provide systems and methods for generating a road map that is based on a comprehensive consideration of integrity, validity and conciseness.

SUMMARY

According to an aspect of the present disclosure, a remote navigation device configured to communicate with a navigation terminal, may include at least one storage medium including a set of instructions for generating a road map, and at least one processor in communication with the storage medium, wherein when executing the set of instructions, the at least one processor may be directed to: obtain a navigation route for the navigation terminal and a current location of the navigation terminal; obtain road network data associated with the current location of the navigation terminal based on the navigation route and the current location of the navigation terminal, wherein the road network data includes a plurality of links and a plurality of nodes, wherein each of the plurality of nodes is connected to one or more links, the one or more of links including at least one type of links; determine a level for each of the plurality of nodes; for each of the plurality of nodes, determine one or more road links that are connected to the node; for each of the plurality of nodes, determine one or more target links for the at least one type of links connected to the node based on the level of the node; generate a road map based on the target links.

According to another aspect of the present disclosure, a method for generating a road map may be implemented on a computing device having at least one processor, at least one computer-readable storage medium, and a communication platform connected to a network. The method may include one or more following operations: obtaining a navigation route for a navigation terminal and a current location of the navigation terminal; obtaining road network data associated with the current location of the navigation terminal based on the navigation route and the current location of the navigation terminal, wherein the road network data includes a plurality of links and a plurality of nodes, wherein each of the plurality of nodes is connected to one or more links, the one or more of links including at least one type of links; determining a level for each of the plurality of nodes; for each of the plurality of nodes, determine one or more target links for the at least one type of links connected to the node based on the level of the node; generating a road map based on the target links.

According to still another aspect of the present disclosure, a non-transitory computer readable medium is provided. The non-transitory computer readable medium may include at least one set of instructions for generating a road map, wherein when executed by at least one processor of a computer device, the at least one set of instructions directs the at least one processor to: obtain a navigation route for the navigation terminal and a current location of the navigation terminal; obtain road network data associated with the current location of the navigation terminal based on the navigation route and the current location of the navigation terminal, wherein the road network data includes a plurality of links and a plurality of nodes, wherein each of the plurality of nodes is connected to one or more links, the one or more of links including at least one type of links; determine a level for each of the plurality of nodes; for each of the plurality of nodes, determine one or more road links that are connected to the node; for each of the plurality of nodes, determine one or more target links for the at least one type of links connected to the node based on the level of the node; generate a road map based on the target links.

In some embodiments, the determining a level for each of the plurality of nodes may include: obtaining nodes on the navigation route from the plurality of nodes; designating a node from the nodes on the navigation route as a reference node; for each of the nodes on the navigation route, determining a level of the node based on a distance between the node and the reference node; obtaining nodes not on the navigation route from the plurality of nodes; for each of the nodes not on the navigation route, determine a level of the node based on the level of the node on the navigation route and a topology relationship relating to the plurality of nodes.

In some embodiments, for each of the nodes on the navigation route, the determining the level of the node based on the distance between the node and the reference node may include: determining whether the distance between the node and the reference node is greater than a first threshold; in response to the determination that the distance between the node and the reference node is smaller than or equal to the first threshold, determining the level of the node as a first value; in response to the determination that the distance between the node and the reference node is greater than the first threshold, determining the level of the node as a second value.

In some embodiments, the levels of two nodes of the plurality of nodes connected by an internal link, a roundabout link, or a short link are the same.

In some embodiments, the determining the one or more target link for one type of links connected to the node based on the level of the node may include: determining whether the level of the node is the first value; in response to the determination that the level of the node is the first value, determining all of the type of links connected to the node as the target links.

In some embodiments, the determining the one or more target link for one type of links connected to the node based on the level of the node may include: determining whether the level of the node is the first value; in response to the determination that the level of the node is not the first value, determining whether there is only one link with the type; in response to the determination that there is only one link with the type, designating the link as the target link for the type; in response to the determination that there is not only one link with the type, determining a score for each of the type of links connected to the node; determining a target link based on the scores relating to the type of links connected to the node.

In some embodiments, the determining the target link based on the scores relating to the type of links may include: determining whether the highest score of the scores is larger than a second threshold; in response to the determination that the highest score is larger than the second threshold, designating the link corresponding to the highest score as the target link.

In some embodiments, the determining the target link based on the scores relating to a type of links may include: in response to the determination that the highest score is small than or equal to the score threshold, generating a simulated link with a score greater than the second threshold; designating the simulated link as the target link.

In some embodiments, the generating the road map based on the target links may include: determining a transfer matrix associated with the current location of the navigation terminal; generating the road map based on the transfer matrix and the target links.

In some embodiments, the method may further include: determining an identification location of the navigation terminal on the road map based the location of the navigation terminal and the transfer matrix, wherein an identification of the navigation terminal is set on the identification location.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures, and wherein.

DETAILED DESCRIPTION

Figure 1:
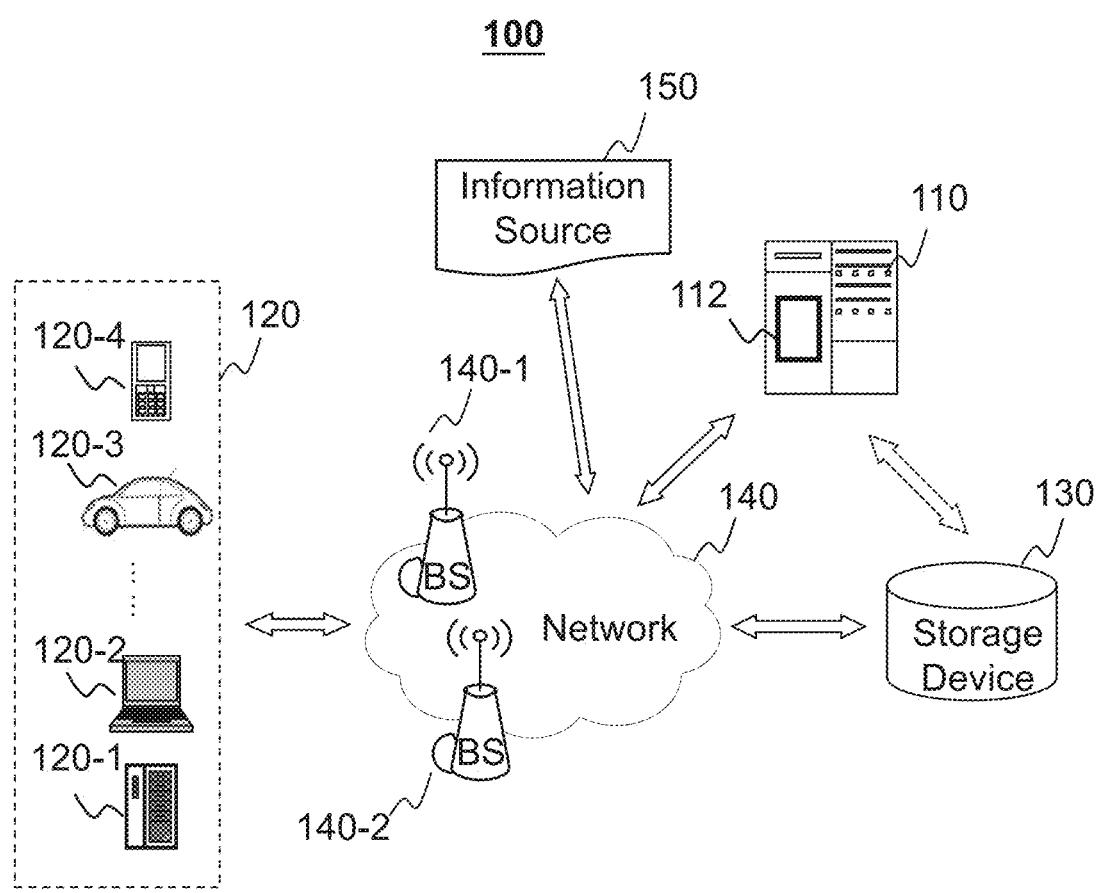
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the system and method in the present disclosure is described primarily in regard to online car hailing services, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "node" in the present disclosure may refer to a point that represents a connection or a joint of roads in the road network. For example, road A intersects road B at an intersection, the point corresponding to the intersection may be designated as a node in the road network. The term "link" in the present disclosure may refer to a line that represents a road or part of a road in the road network. A link may connect different nodes. For example, road A intersects road B at intersection C and intersects road D at intersection E. The line corresponding to the section of road A between the intersections C and E may be designated as a link. The term "target link" in the present disclosure may refer to a link which has been determined to be useful for a user to make a decision during his or her navigation based on one or more links connected to a node. The term "simulated link" in the present disclosure may refer to a link that does not exist in the real-world road network and is simulated by the system of the present disclosure. For example, if each of a plurality of links connected to the node does not meet the requirement after evaluation, a "simulated link" may be generated and may be designated as a target link.

The location in the present disclosure may be acquired by positioning technology embedded in a navigation terminal. The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi™) positioning technology, or the like, or any combination thereof. One or more of the above positioning technologies may be used interchangeably in the present disclosure.

An aspect of the present disclosure relates to online systems and methods for generating a road map. According to the present disclosure, the systems may determine a level for each of a plurality of intersections (nodes) based on the current location of a navigation terminal and then determine target road segments (links) associated with the intersections. The systems may then generate a road map based on the target road segments to provide navigation services. Since the target links are determined based on the level of the links, it may provide more concise road maps to service requesters. In some embodiments, only the target links are displayed to the user when the user approaches the node. Such more focused navigation services may prevent user distraction and improve decision making by the user.

It should be noted that the online on-demand service is a newly emerged service rooted in post-Internet era. It provides the technical solutions to service requesters that could raise in post-Internet era. In pre-Internet era, it is impossible to provide a navigation route to service requesters, especially provide a concise road map to service requesters based on the levels of the plurality of nodes. Therefore, the present solution is deeply rooted in and aimed to solve a problem only occurred in post-Internet era.

FIG. 1 is a block diagram of an exemplary system 100 for generating a road map according to some embodiments of the present disclosure. For example, the system 100 may be an online transportation service platform for transportation services such as route navigation, car hailing services, chauffeur services, vehicle delivery services, carpooling services, bus services, driver hiring services, and shuttle services, etc. The system 100 may include a server 110, a navigation terminal 120, a storage device 130, a network 140, and an information source 150. The server 110 may include a processing engine 112.

The server 110 may be configured to process information and/or data relating to a request from a navigation terminal 120, for example, a map displaying request. For example, the server 110 may receive a request from a navigation terminal 120, and process the request to generate a road map for the navigation terminal 120. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the navigation terminal 120 and/or the storage device 130 via the network 140. As another example, the server 110 may be directly connected to the navigation terminal 120, and/or the storage device 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the request to perform one or more functions described in the present disclosure. For example, the processing engine 112 may obtain a request from the navigation terminal 120 to generate a road map. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the navigation terminal 120 may be an individual, a tool or other entity directly relating to the request. In some embodiments, the navigation terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 120-4 may include an onboard computer, an onboard television, etc. In some embodiments, the navigation terminal 120 may be a device with positioning technology for locating the position of the user and/or the navigation terminal 120. In some embodiments, the navigation terminal 120 may communicate with another positioning device to determine the position of the user and/or the navigation terminal 120. In some embodiments, the navigation terminal 120 may transmit positioning information to the server 110.

The storage device 130 may store data and/or instructions related to the request. In some embodiments, the storage device 130 may store data obtained/acquired from the navigation terminal 120. In some embodiments, the storage device 130 may store data and/or instructions that the server 110 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 140 to communicate with one or more components in the system 100 (e.g., the server 110, the navigation terminal 120). One or more components in the system 100 may access the data or instructions stored in the storage device 130 via the network 140. In some embodiments, the storage device 130 may be directly connected to or communicate with one or more components in the system 100 (e.g., the server 110, the navigation terminal 120). In some embodiments, the storage device 130 may be part of the server 110.

The network 140 may facilitate exchange of information and/or data. In some embodiments, one or more components in the system 100 (e.g., the server 110, the navigation terminal 120, and the storage device 130) may send and/or receive information and/or data to/from other component(s) in the system 100 via the network 140. For example, the server 110 may obtain/acquire service request from the navigation terminal 120 via the network 140. In some embodiments, the network 140 may be any type of wired or wireless network, or combination thereof. Merely by way of example, the network 140 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the system 100 may include one or more network access points. For example, the system 110 may include wired or wireless network access points such as base stations and/or wireless access points 140-1, 140-2, . . . , through which one or more components of the system 100 may be connected to the network 140 to exchange data and/or information.

The information source 150 may be a source configured to provide other information for the system 100. The information source 150 may provide the system 100 with map and/or road information, such as names of roads, width information of the roads, length information of the roads, directions of the roads, lane information, or the like. The information source 150 may be implemented in a single central server, multiple servers connected via a communication link, or multiple personal devices. When the information source 150 is implemented in multiple personal devices, the personal devices can generate content (e.g., as referred to as the "user-generated content"), for example, by uploading text, voice, image, or video to a cloud server. The information source 150 may be generated by the multiple personal devices and/or the cloud server.

Figure 2:
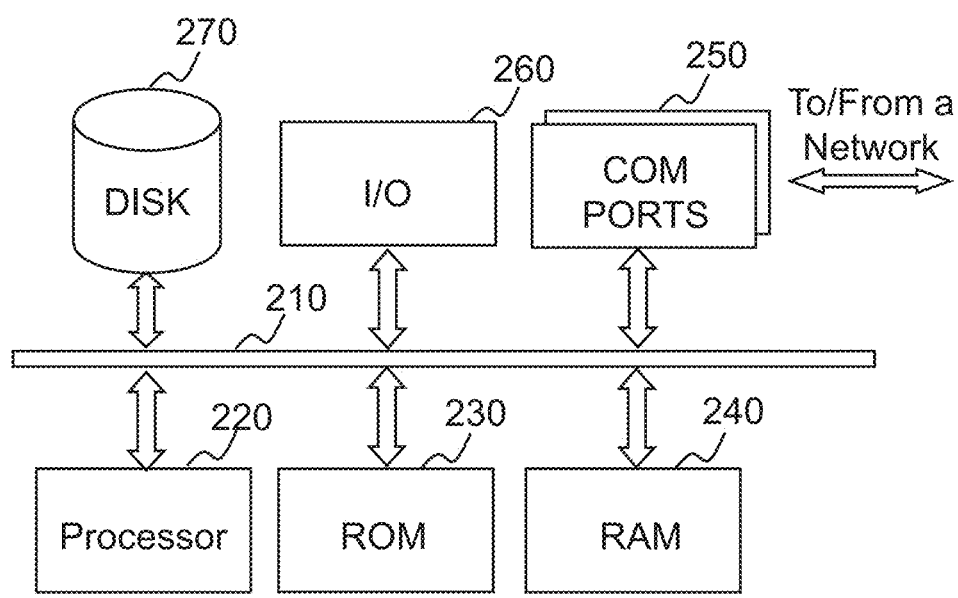
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the navigation terminal 120, the storage device 130, and/or the information source 150 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1 and 2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage, and data storage of different forms including, for example, a disk 270, a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
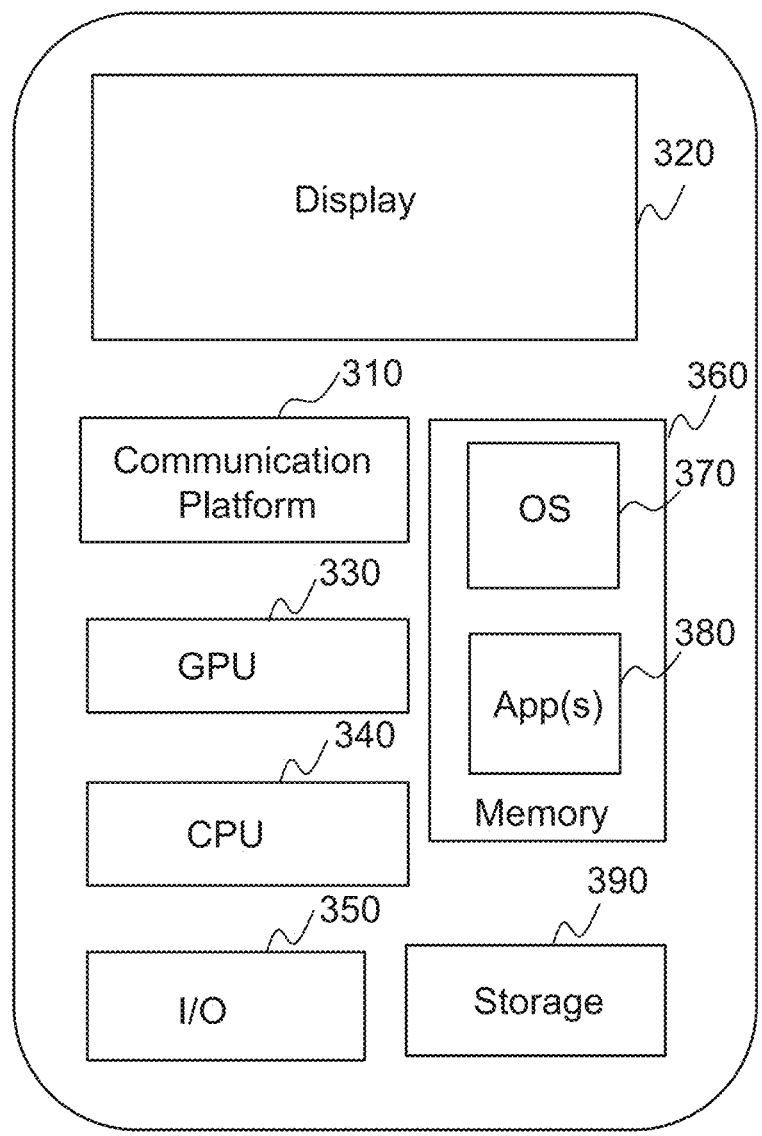
FIG. 3 is schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the navigation terminal 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to a service request or other information from the location based a service providing system on the mobile device 300. User interactions with the information stream may be achieved via the I/O 350 and provided to the processing engine 112 and/or other components of the system 100 via the network 140.

In order to implement various modules, units and their functions described above, a computer hardware platform may be used as hardware platforms of one or more elements (e.g., a module of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
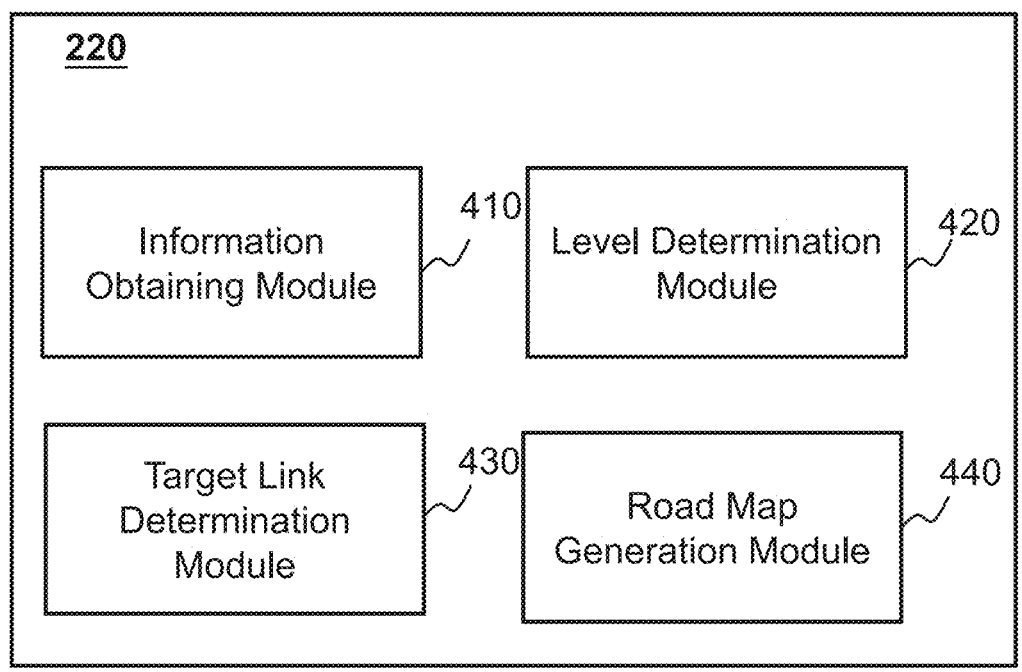
FIG. 4 is a block diagram illustrating an exemplary processing engine according to some embodiments of the present disclosure.

FIG. 4 is a block diagram illustrating an exemplary processor 220 according to some embodiments. The processor 220 may include an information obtaining module 410, a level determination module 420, a target link determination module 430, and a road map generation module 440. The modules may be hardware circuits of all or part of the processor 220. The modules may also be implemented as an application or set of instructions read and executed by the processing engine. Further, the modules may be any combination of the hardware circuits and the application/instructions. For example, the modules may be the part of the processor 220 when the processor is executing the application/set of instructions.

The information obtaining module 410 may obtain a navigation route for the navigation terminal 120 and a current location of the navigation terminal 120, road network data associated with the current location of the navigation terminal 120 based on the navigation route and the current location of the navigation terminal 120, or the like, or any combination thereof. The road network data includes a plurality of links and a plurality of nodes. Each of the plurality of nodes may be connected to one or more links. The links may include a preceding link or a succeeding link. It should also be noted that although that a navigation terminal 120 is herein stated, other networked navigation devices may also be used in the present invention.

The level determination module 420 may determine a level for each of the plurality of nodes included in the road network data. In some embodiments, the level determination module 420 may obtain nodes on the navigation route from the plurality of nodes associated with the road network data and designate a node from the plurality of nodes as a reference node. The levels of the nodes on the navigation route may be determined based on a distance between the node and the reference node. The level determination module 420 may obtain nodes not on the navigation route from the plurality of nodes and determine the levels of the nodes based on the levels of the nodes on the navigation route and a topology relationship relating to the plurality of nodes.

The target link determination module 430 may determine one or more target links based on the links connected to a node. In some embodiments, the target link determination module 430 may determine the one or more target links based on the levels of the nodes. In some embodiments, the target link determination module 430 may determine a score for each of the links connected to the node and determine the one or more target links based on the scores of the links. In some embodiments, the target link determination module 430 may generate a simulated link and designate the simulated link as the target link.

The road map generation module 440 may generate a road map. In some embodiments, the road map generation module 440 may determine a transfer matrix associated with the current location of the navigation terminal 120. In some embodiments, the road map generation module 440 may generate the road map based on the transfer matrix and the target links.

The modules in the processor 220 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the target link determination module 430 may be integrated in the level determination module 420 as a single module that may both determine the level of the node and determine the target link of the node based on the level. As another example, the level determination module 420 may be divided into two units of a route node level determination unit and a non-route node level determination unit to implement the functions of the level determination module 420, respectively.

Figure 5:
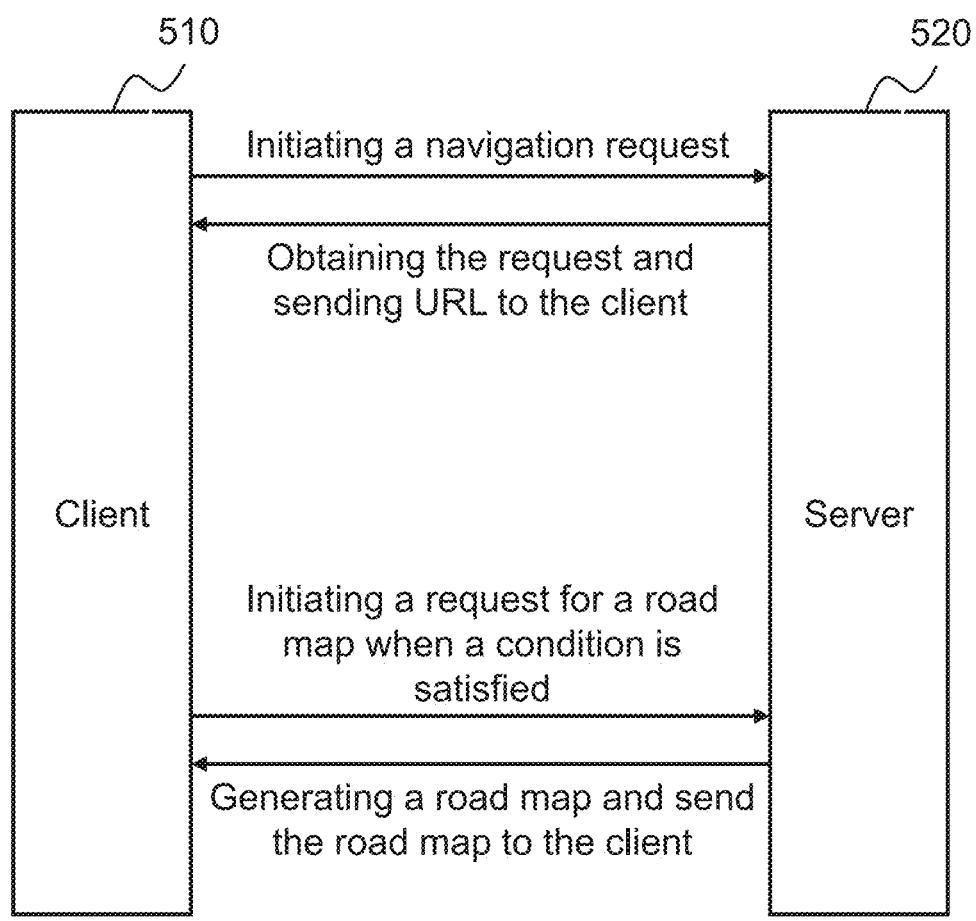
FIG. 5 is a schematic diagram illustrating an exemplary communication process between a client and a server according to some embodiments of the present disclosure.

FIG. 5 is a schematic diagram illustrating an exemplary communication process between a client and a server according to some embodiments of the present disclosure. In some embodiments, the client 510 (e.g., the navigation terminal 120) may initiate a navigation request. The navigation request may include original data associated with the client 510 and/or the user of the client 510. For example, the original data may include a request time of the navigation request, a departure location, a destination, or the like, or any combination thereof. The server 520 (e.g., the server 110) may obtain the navigation request via a wired or a wireless network (e.g., the network 140). After obtaining the navigation request, the server 520 may determine one or more navigation routes based on the navigation request by variety of existing technology. For example, the one or more navigation routes may be determined based on modeling languages, including Stanford Research Institute Problem Solver (STRIPS) language, Action Description Language (ADL), Planning Domain Definition Language (PDDL), or the like, or any combination thereof. As another example, the one or more navigation routes may be determined based on route planning techniques and/or algorithms, including machine learning technique, artificial intelligence technique, template approach technique, artificial potential field technique, double direction A algorithm, A-star algorithm, sample algorithm, or the like, or any combination thereof. In some embodiments, the server 520 may analyze each of the one or more navigation routes to obtain the number of intersection that are located on a navigation route. For each intersection, the server 520 may obtain various data needed to generate a road map associated with the intersection, for example, a transfer matrix, a plurality of road segments connected to the intersection, etc. After processing, the server 520 may generate a uniform Resource Locator (URL) to the client 510. When a condition is satisfied (e.g., when the current location of the navigation terminal 120 is a predetermined distance from an intersection), the client 510 may send a request (e.g., a Hyper Text Transfer protocol (HTTP) request) to the server 520 based on the URL. The predetermined distance may be from 1 to 100 meters, e.g., 10 meters, 20 meters, 30 meters, 40 meters, 50 meters, 60 meters, 70 meters, 80 meters, or 90 meters. In some embodiments, the request may be a road map generation request. The server 520 may then generate the road map based on the various data by executing the operations described in elsewhere in the present disclosure, for example, FIGS. 6-11 and the description thereof. The road map may be sent to the client 510 to present to the user of the client 510.

Figure 6:
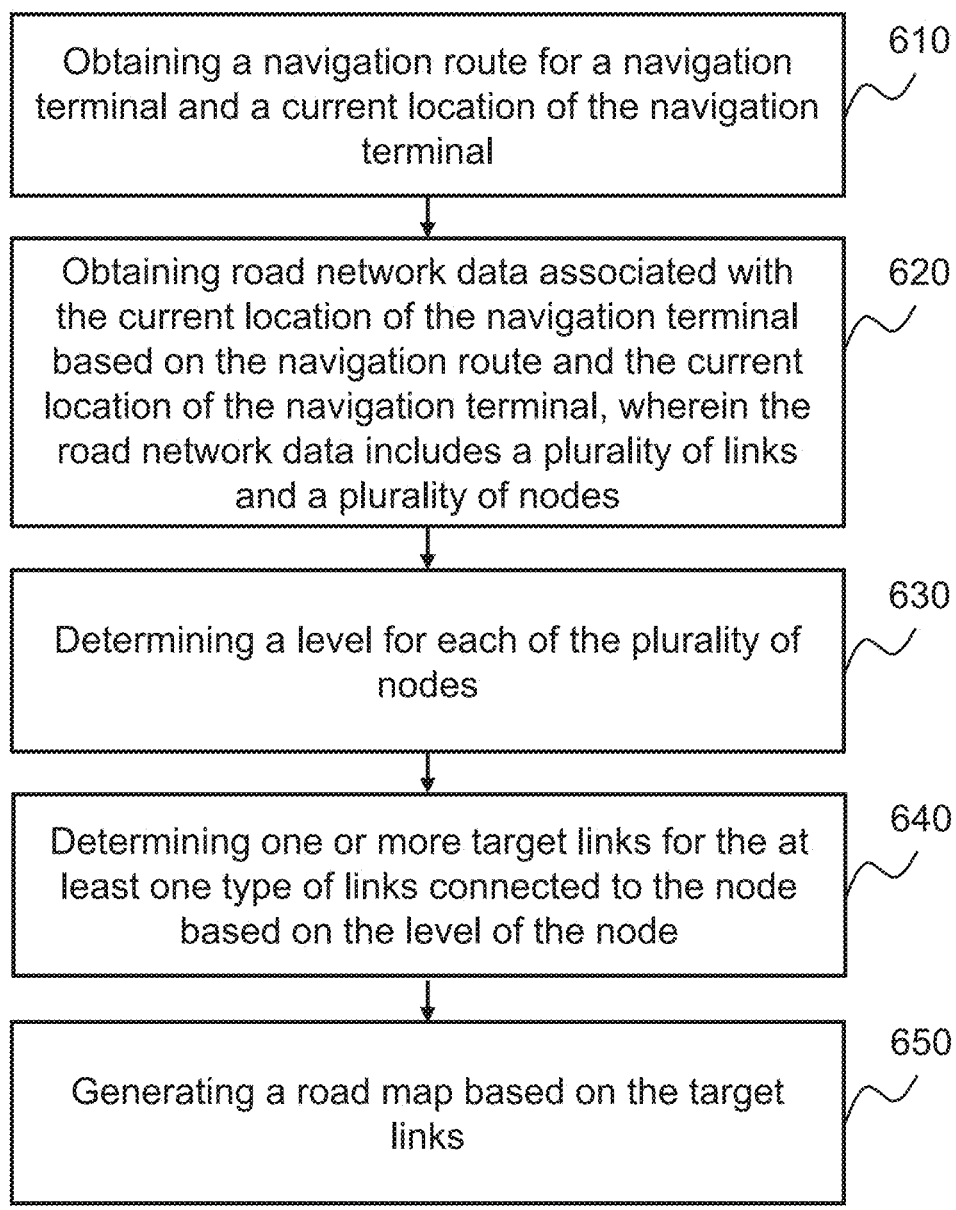
FIG. 6 is a flowchart of an exemplary process and/or method for generating a road map according to some embodiments of the present disclosure.

FIG. 6 is a flowchart of an exemplary process and/or method 600 for generating a road map according to some embodiments of the present disclosure. In some embodiments, one or more steps in the process and/or method 600 may be implemented in the system 100 illustrated in FIG. 1. For example, one or more steps in the process and/or method 600 may be stored in the storage device 130 and/or the storage (e.g., the ROM 230, the RAM 240) as a form of instructions, and invoked and/or executed by the server 110 (e.g., the processing engine 112 in the server 110, or the processor 220 of the processing engine 112 in the server 110).

In 610, the processor 220 (e.g., the information obtaining module 410) may obtain a navigation route for the navigation terminal 120 and a current location of the navigation terminal 120.

In some embodiments, the navigation terminal 120 may include a terminal (e.g., a wireless terminal such as a smart phone) used by a user (e.g., a driver). The navigation route may include one or more navigation options via which the user of the navigation terminal 120 can reach a desired location (e.g., a destination of a trip by the user). In some embodiments, when the user is unfamiliar with traffic conditions, the navigation route may assist the user to complete a trip. In some embodiments, the navigation route may include a travel direction. For example, the navigation terminal 120 may remind the user of the navigation terminal 120 to go along a specific direction based on the navigation route.

The current location may include a positioning location of the navigation terminal 120. In some embodiments, the navigation terminal 120 may be implemented with an application that can obtain the location of the navigation terminal 120 via communicating with a positioning system. The navigation terminal 120 may send the current location of the navigation terminal 120 to the processor 220 via the network 140. The positioning technology may include a Global Positioning System (GPS) technology, a Beidou navigation system technology, a Global Navigation Satellite System (GLONASS) technology, a Galileo positioning system (Galileo) technology, a Quasi-Zenith Satellite System (QAZZ) technology, a base station positioning technology, a Wi-Fi positioning technology, or the like, or any combination thereof.

In 620, the processor 220 (e.g., the information obtaining module 410) may obtain road network data associated with the current location of the navigation terminal 120 based on the navigation route and the current location of the navigation terminal 120.

In some embodiments, the processor 220 (e.g., the information obtaining module 410) may obtain the road network data of a road network including the current location of the navigation terminal 120 and all or part of the navigation route. As used here, the term "road network" refers to an area and one or more connected or unconnected roads therein. In some embodiments, the road network may have an arbitrary size. For example, the road network may be a square-shaped road network with a size of 500 meters×500 meters, a rectangular-shaped road network with a size of 300 meters×400 meters, or a circular-shaped road network with a diameter of 500 meters, or the like. The size of the road network may be changed according to the application scenarios, and it is not intended to limit the scope of the present disclosure. In some embodiments, the processor 220 (e.g., the information obtaining module 410) may designate the current location of the navigation terminal 120 or a node closest to the current location of the navigation terminal 120 as the center to obtain the road network data of the road network with an arbitrary size.

In some embodiments, the road network data may include a plurality of links and a plurality of nodes. Each of the plurality of nodes may be connected to one or more links. The node may refer to a point that represents a connection or a joint of roads in the road network. For example, the node may refer to an intersection. The link may refer to an interconnecting line that connects different nodes in the road network. The one or more links may include at least one type, e.g., a preceding link, a succeeding link. In some embodiments, a node may be only associated with one type of links. For example, a node may be only associated with one or more preceding links. As another example, a node may be only associated with one or more succeeding links. In some embodiments, a node may be associated with two or more types of links. For example, the node may be not only associated with one or more preceding links, but also one or more succeeding links.

The preceding link and/or the succeeding link may be attributes of the links connected to a node. For a specific node, the preceding link may refer to a link from one node to the specific node along a reference direction, and the succeeding link may refer to a link from the specific node to another node along the reference direction. For a specific link, the specific link may be a preceding link of one node, and at the same time, it may also be a succeeding link of another node. The attributes may be determined based on the travel direction relating to the navigation route. For instance, FIG. 11 illustrates exemplary road network data according to some embodiments of the present disclosure.

Figure 11:
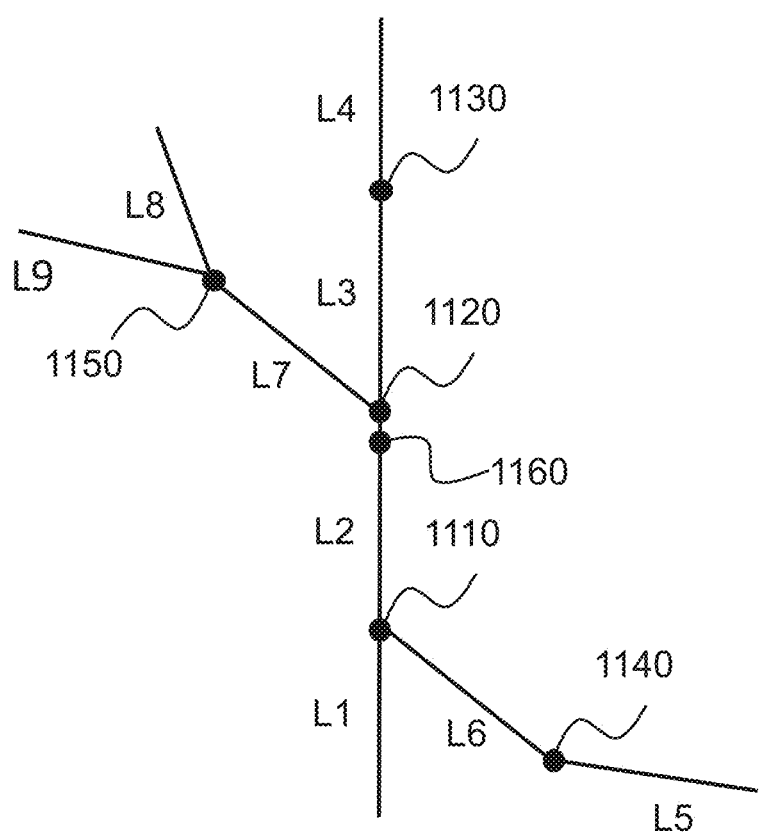
FIG. 11 illustrates exemplary road network data according to some embodiments of the present disclosure.

As shown in FIG. 11, the navigation route may include links L1, L2, L3, and L4. The travel direction of the navigation route may be from L1 to L2 to L3 to L4. In some embodiments, the travel direction may be designated as a reference direction. The node 1120 may be the center of the road network. Searching substantially along the travel direction relating to the navigation route, the node 1130 may be obtained via link L3 from the node 1120 and the node 1150 may be obtained via link L7 from the node 1120. The link L3 may be a succeeding link of the node 1120 and may be a preceding link of the node 1130. The link L7 may be a succeeding link of the node 1120 and may be a preceding link of the node 1150. Similarly, the link L4 may be a succeeding link of the node 1130 and may be a preceding link of another node (not shown in the FIG. 11), the link L8 may be a succeeding link of the node 1150 and may be a preceding link of another node (not shown in the FIG. 11). Searching substantially along the reverse travel direction relating to the navigation route, the node 1110 may be obtained via link L2 from the node 1120. The link L2 may be a preceding link of the node 1120 and may be a succeeding link of the node 1110. Similarly, the links L1 and L6 may be preceding links of the node 1110. The link L1 may be a succeeding link of another node (not shown in the FIG. 11). The link L6 may be a succeeding link of the node 1140. The link L5 may be a preceding link of the node 1140 and may be a succeeding link of another node (not shown in the FIG. 11).

In 630, the processor 220 (e.g., the level determination module 420) may determine a level for each of the plurality of nodes.

The level of a node may reflect a degree that the node may influence the user. Nodes with different levels may represent the nodes with different degrees of influence on the user. If a node is important for the user to make a decision relating to the node (e.g., turning right, turning left, going straight), more detailed information associated with the node (e.g., links connected to the node) may be presented to the user comprehensively. The level may be presented in any format. In some embodiments, the level may be presented in a numerical, for example, 0, 1, 2, 3. For illustration purpose, the more important a node is for the user, the higher the level of the node is. If a node with level 0 may be more important for the user in comparison with a node with level 1, level 0 is higher than level 1, and vice versa. The processor 220 may determine more detailed information associated with the node with level 0 than the node with level 1. For example, all the links directly connected to the node with level 0 may be presented to the user and only part of links directly connected to the node with level 1 may be presented to the user. In some embodiments, the level may be presented in a character format, for example, A, B, C, D. If a node with level A may be more important for the user in comparison with a node with level B, level A is higher than level B, and vice versa.

In some embodiments, the processor 220 (e.g., the level determination module 420) may first determine levels of nodes on the navigation route. In some embodiments, the processor 220 may designate a reference node first, then the processor may determine the level of a node on the navigation route based on a distance along the route between the node and the reference node. After the levels of all the nodes on the navigation route have been determined, the processor 220 (e.g., the level determination module 420) may determine levels of nodes not on the navigation route based on the levels of the nodes on the navigation route and a topology relationship relating to the plurality of nodes. The determination of the level for each of the plurality of nodes may be found in FIG. 7 and FIG. 11, and the description thereof in the present disclosure.

In 640, the processor 220 (e.g., the target link determination module 430) may determine one or more target links for the at least one type of link for each of the node based on the level of the node.

In some embodiments, different strategies may be applied for the determination of target links for different levels of nodes. In some embodiments, for a high-level node, the processor 220 (e.g., the target link determination module 430) may determine all the links connected to the node as the target links. In some embodiments, for a low-level node, the processor 220 (e.g., the target link determination module 430) may determine one or more target links for the node based on the number of links connected to the node and/or scores determined for the links connected to the node. The determination of the target link may be found in FIG. 9 and the description thereof in the present disclosure.

In 650, the processor 220 (e.g., the road map generation module 440) may generate a road map based on the target links.

The road map may be used to satisfy the user's navigation needs (e.g., helping the user to drive his or her vehicle along the navigation route). The road map may be a two-dimensional image, a three-dimensional image, etc. The road map may include a plurality of intersections corresponding to the plurality of nodes, and a plurality of road segments corresponding to the target links. In some embodiments, the road map may also include an identification location of the navigation terminal 120 that may correspond to the current location of the navigation terminal 120. In some embodiments, the processor 220 (e.g., the road map generation module 440) may first determine a transfer matrix associated with the current location of the navigation route. For example, the transfer matrix may include a translation matrix, a scaling matrix, a rotation matrix, a symmetric matrix, or the like, or any combination thereof. Then, the processor 220 (e.g., the road map generation module 440) may generate the road map based on the transfer matrix and the target links. The generating of the road map may be found in FIG. 10 and the description thereof in the present disclosure.

Figure 13A:
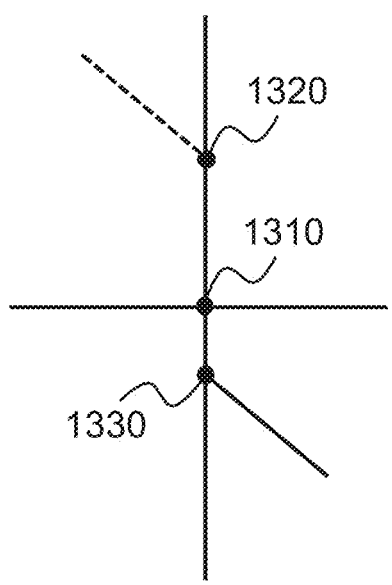
FIGS. 13A and 13B illustrate exemplary road networks according to some embodiments of the present disclosure.
Figure 13B:
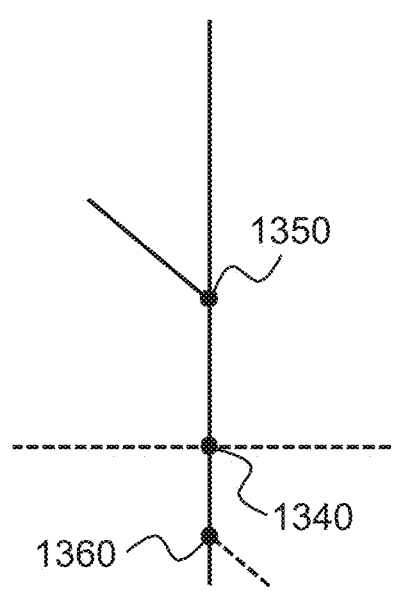

It should be noted that all or part of the process 600 may be performed repeatedly in real time. For example, the processor 220 may obtain the current location of the navigation terminal 120 and perform the subsequent operations of the process 600 at a regular time interval (e.g., 5 seconds, 10 seconds, 15 seconds) or at an unregular time interval. The levels of the nodes and the target link(s) for each node may change over time. FIGS. 13A and 13B illustrate an exemplary road network according to some embodiments of the present disclosure. As shown in FIG. 13A, the node 1310 may be designated as the reference node and the levels of the nodes 1320 and 1330 may be determined based on the distance between reference node 1310 and the nodes 1320/1330, respectively. After a time interval, as shown in FIG. 13B, the node 1350 (the node 1350 may represent the same intersection as the node 1320) may be designated as the reference node and the levels of the nodes 1340 (the node 1340 may represent the same intersection as the node 1310) and 1360 (the node 1360 may represent the same intersection as the node 1330) may be determined based on the distances between reference node 1350 and the nodes 1340/1360, respectively. The levels of the nodes may be re-determined based on the new distances. In some embodiments, the target link(s) of the nodes determined based on the levels of the nodes may also change. As shown in FIGS. 13A and 13B, the links represented by solid lines may be determined as the target links of the nodes. The target link(s) of a same node may be different at different time periods and the road map generated based on the target link(s) may change correspondingly.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 600. As another example, all the steps in the exemplary process/method 600 may be implemented in a computer-readable medium including a set of instructions. The instructions may be transmitted in a form of electronic current or electrical signals.

Figure 7:
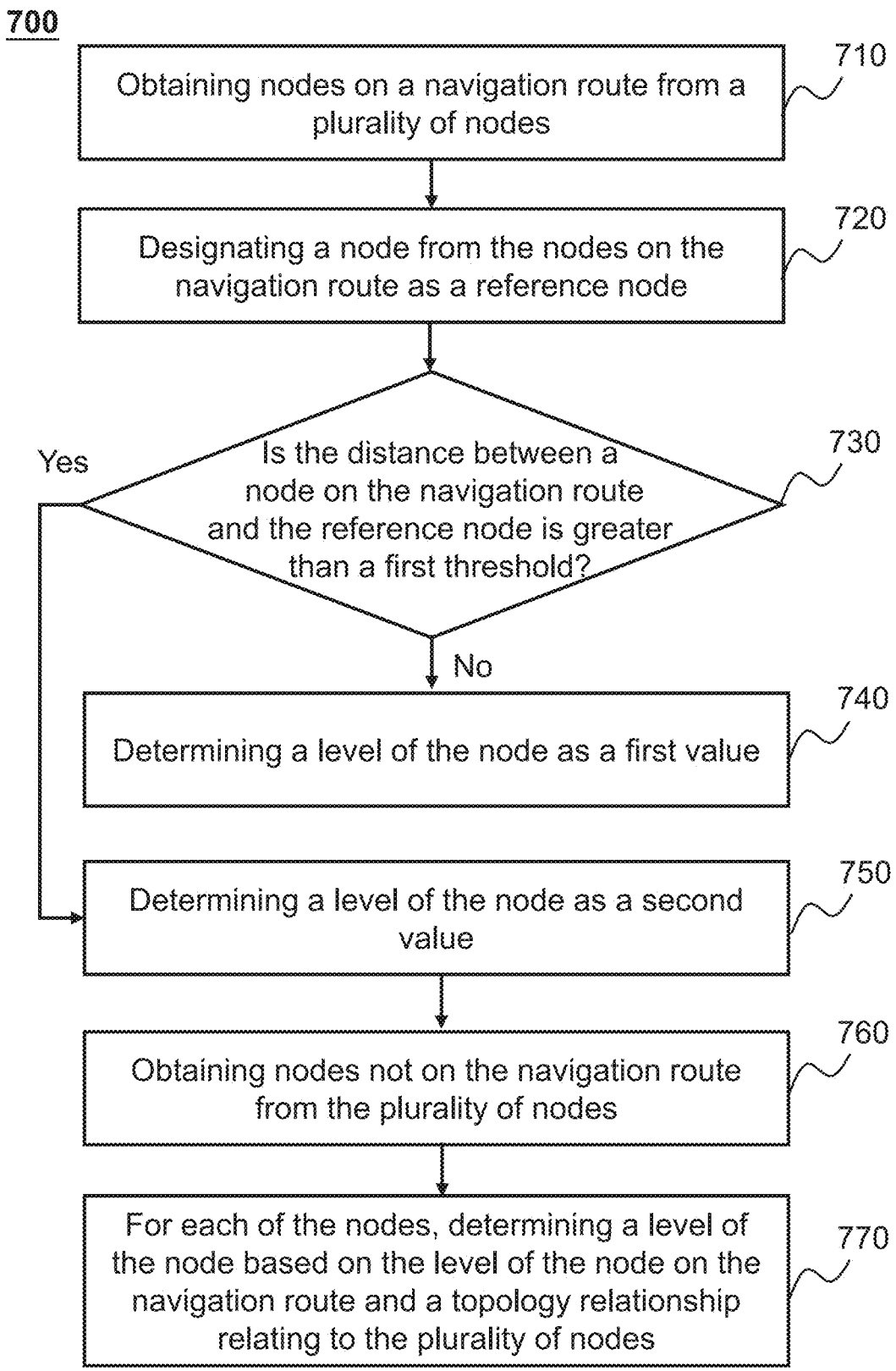
FIG. 7 is a flowchart of an exemplary process and/or method for determining a level of a node according to some embodiments of the present disclosure.

FIG. 7 is a flowchart of an exemplary process and/or method 700 for determining a level of a node according to some embodiments of the present disclosure. In some embodiments, the process and/or method 700 may be used to determine the level for each of the plurality of nodes in step 630 of process and/or method 600. In some embodiments, one or more steps in the process and/or method 700 may be implemented in the system 100 illustrated in FIG. 1. For example, one or more steps in the process and/or method 700 may be stored in the storage device 130 and/or the storage (e.g., the ROM 230, the RAM 240) as a form of instructions, and invoked and/or executed by the server 110 (e.g., the processing engine 112 in the server 110 or the processor 220 of the processing engine 112 in the server 110).

In 710, the processor 220 (e.g., the level determination module 420) may obtain nodes on the navigation route from the plurality of nodes associated with the road network data. In some embodiments, the nodes on the navigation route may refer to nodes that connect the links of the navigation route. For example, as shown in FIG. 11, the nodes on the navigation route may include the nodes 1110, 1120, and 1130.

In 720, the processor 220 (e.g., the level determination module 420) may designate a node from the nodes on the navigation route as a reference node.

In some embodiments, the processor 220 may designate the node close to the current location of the navigation terminal 120 as the reference node. As shown in FIG. 11, the number 1160 represents the current location of the navigation terminal 1120 and the node 1120 is a node close to the current location of the navigation terminal 120. The processor 220 may designate the node 1120 as the reference node. In some embodiments, the processor 220 may designate a node as the reference node based on its distance to the navigation terminal 120 as well as the direction of that the navigation terminal 120 is move. For example, in certain embodiments, only the closest node that has not been passed by the navigation terminal 120 in the trip would be designated as the reference node.

In 730, the processor 220 (e.g., the level determination module 420) may determine whether a distance between the node and the reference node is greater than a first threshold for each of the nodes on the navigation route.

In some embodiments, the distance may include an actual distance along the navigation route between the intersection corresponding to the node and the intersection corresponding to the reference node in the real world. The processor 220 may communicate with a positioning system to obtain the distance determined by the positioning system directly, or the processor 220 may obtain the distance by accessing the length information of the road network stored in the storage device 130, the ROM 230, and/or the RAM 240 via the network 140. The first threshold may be a preset distance value stored in the system, for example, 50 meters, or may be a distance value determined according to different applications scenarios. If the distance between the node and the reference node is smaller or equal to the first threshold, the process 700 may proceed to step 740. If the distance between the node and the reference node is greater than the first threshold, the process 700 may proceed to step 750. In some embodiments, the distance may include a time-space distance along the navigation route, which takes into consideration not only the real-world distance along the navigation route, but also the estimated time needed to travel such distance. The weight of the real-world distance and the weight of the estimated travel time may be predetermined by the system or vary according to user preferences.

In 740, the processor 220 (e.g., the level determination module 420) may determine the level of the node as a first value. The level of the node may reflect a degree that the node may influence the user. Nodes with different levels may represent the nodes with different degrees of influence on the user. If a node is important for the user to make a decision relating to the node (e.g., turning right, turning left, going straight), more detailed information associated with the node (e.g., links connected to the node) may be presented to the user comprehensively. The first value may refer to the highest degree that the node influences the user. All the information associated with the node (e.g., all the links connected to the node) may be presented to the user. In some embodiments, the first value may presented in a numerical format, for example, 0. In some embodiments, the first value may be presented in a character format, for example, A. It should be noted that the first value may be in any format, and is not limited by the description above.

In 750, the processor 220 (e.g., the level determination module 420) may determine the level of the node as a second value. In some embodiments, the second value may refer to a lower degree that the node influences the user compared with the first value. In some embodiments, the second value may have the same format with the first value. For example, if the first value is 0, the second value may be in a numerical format ranked behind 0, such as 1, 2, etc. As another example, if the first value is A, the second value may be a letter ranked behind A, such as B, C, or other letter. For the purpose of illustration, the levels of the nodes described elsewhere in the present disclosure may be in numerical format.

In 760, the processor 220 (e.g., the level determination module 420) may obtain nodes not on the navigation route from the plurality of nodes. For example, as shown in FIG. 11, the nodes not on the navigation route may include the nodes 1140 and 1150. After determining the levels of the nodes on the navigation route, the processor 220 may then determine the levels of the nodes not on the navigation route.

In 770, the processor 220 (e.g., the level determination module 420) may determine a level of the node not on the navigation route based on the levels of the nodes on the navigation route and a topology relationship relating to the plurality of nodes.

The topology relationship relating to the plurality of nodes may refer to a structure of the plurality of the nodes which may be related to a search algorithm. The processor 220 (e.g., the level determination module 420) may determine the level of a node based on the level of a node that is designated as a starting point of searching. For example, as shown in FIG. 11, the processor 220 may search substantially along the travel direction relating to the navigation route from the reference node 1120, and the processor 220 may obtain the node 1150 not on the navigation route via link L3. The level of the node 1150 may be determined based on the level of the reference node 1120. Then the node 1150 may be designated as a new starting point to continue the search. Substantially along the travel direction, another node (not shown in the FIG. 11) may be obtained via link L8 from the node 1150. The processor 220 may determine the level of another node based on the level of the node 1150. Similarly, substantially along the reverse travel direction relating to the navigation route, the node 1140 may be obtained via link L6 from the node 1110, and another node (not shown in the FIG. 11) may be obtained via link L6 from the node 1140. The processor 220 may determine the level of the node 1140 based on the level of the node 1110. The processor 220 may determine the level of another node based on the level of the node 1140. The search algorithm may include a depth first search algorithm, a breadth first search algorithm, a bidirectional breadth first search algorithm, a A-star algorithm, an enumeration algorithm, a backtracking algorithm, a Monte Carlo tree search algorithm, a Hash Function, or the like, or any combination thereof. In some embodiments, if the level of the node is i (e.g., 0, 1, 2, 3) and another node is not on the navigation route and can be directly obtained from the node based on a search algorithm, the level of the other node may be determined as i+1. For example, if the level of node A is 1, node B is not on the navigation route and can be directly obtained from the node A based on a search algorithm, and node C is not on the navigation route and can be obtained from node B based on a search algorithm, the level of node B may be designated as 2 and the level of node C may be designated as 3. Presented only as examples, here larger number represents a lower level.

Figure 12A:
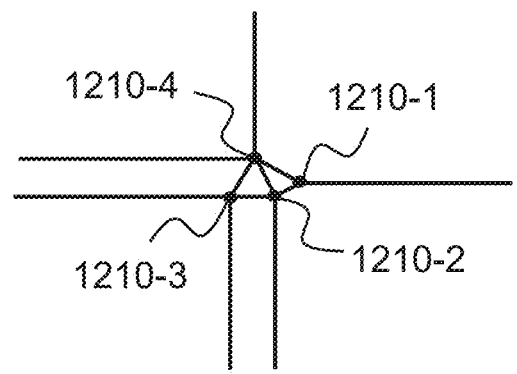
FIGS. 12A through 12C illustrate an exemplary internal link, an exemplary roundabout link, and an exemplary short link according to some embodiments of the present disclosure.
Figure 12B:
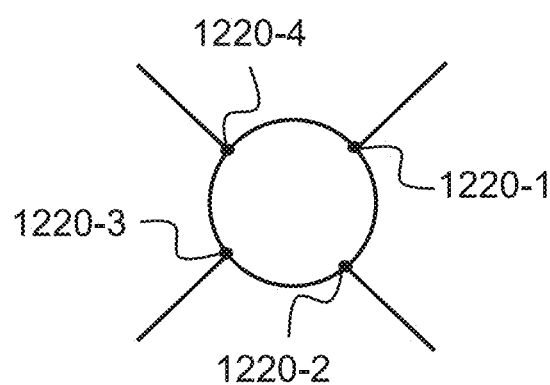
Figure 12C:
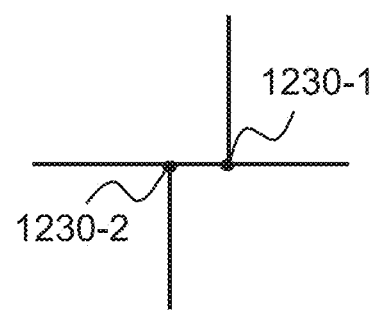

In some embodiments, the levels of two nodes of the plurality of nodes connected by an internal link, a roundabout link, or a short link are the same. In some embodiments, the internal link may refer to a link that is connected to a plurality of nodes representing an intersection. In some embodiments, one link may represent one road, or one road segment. The intersection of the roads may be represented by one node. If there is a barrier along a length of a road and the barrier divides the road into two parts, each part only allows vehicles or the pedestrians to travel in a specific direction, the road may be represented by two links, and each link may represent one part of the road. Such road intersects with other road(s) may generate more than one node and the intersection may be represented by more than one node. Referring to FIG. 12A, FIG. 12A illustrates an exemplary internal link according to some embodiments of the present disclosure. As shown in FIG. 12A, the intersection may be represented by four nodes, 1210-1, 1210-2, 1210-3, and 1210-4. In some embodiments, the links connecting any two nodes of the four nodes may be referred to as the internal links, and the levels of the four nodes may be designated to be the same. In some embodiments, the nodes with internal links may ensure the integrity of the road network. In some embodiments, the roundabout link may refer to a link that is connected to two nodes corresponding to entrances and/or exits of a roundabout. Referring to FIG. 12B, FIG. 12B illustrates an exemplary roundabout link according to some embodiments of the present disclosure. As shown in FIG. 12B, the roundabout has been divided into four links by the nodes corresponding to the entrances and/or exits, for example, the node 1220-1, 1220-2, 1220-3, and 1220-4. The four links may be referred to as the roundabout links. In some embodiments, the levels of the four nodes may be designated to be the same. In some embodiments, the short link may refer to a link corresponding to a road segment with a length less than a threshold length. The threshold length may be a preset length value stored in the system, for example, 5 meters, 10 meters, or may be a length value determined according to different applications scenarios. If the length of a road segment is less than the threshold length, the link corresponding to the road segment may be referred to as the short link. Referring to FIG. 12C, FIG. 12C illustrates an exemplary short link according to some embodiments of the present disclosure. As shown in FIG. 12C, if the road segment corresponding the link connected to the node 1230-1 and the node 1230-2 is less than the threshold length, the link may be referred to as the short link.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. As another example, one or more other optional steps (e.g., a storing step, a preprocessing step) may be added elsewhere in the exemplary process/method 700. As still another example, all the steps in the exemplary process/method 700 may be implemented in a computer-readable medium including a set of instructions. The instructions may be transmitted in a form of electronic current or electrical signals.

Figure 8:
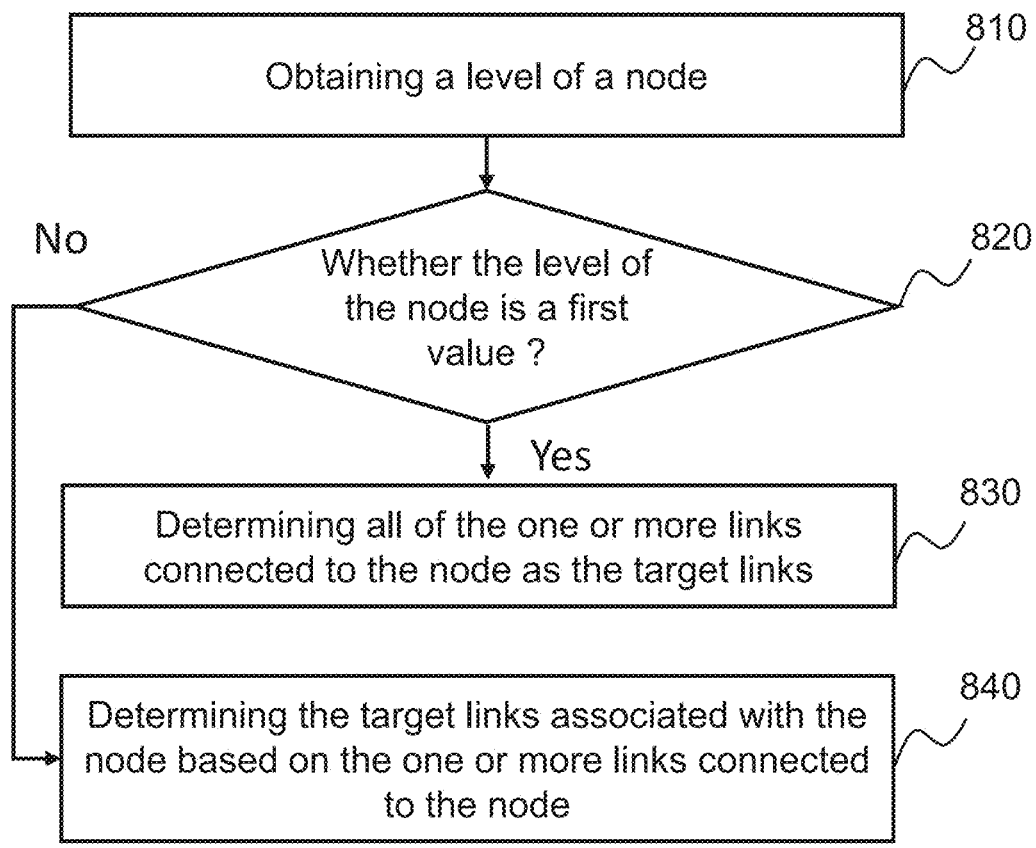
FIG. 8 is a flowchart of an exemplary process and/or method for determining one or more target links for a node according to some embodiments of the present disclosure.

FIG. 8 is a flowchart of an exemplary process and/or method 800 for determining one or more target links for each of the plurality nodes according to some embodiments of the present disclosure. In some embodiments, one or more steps in the process and/or method 800 may be implemented in the system 100 illustrated in FIG. 1. For example, one or more steps in the process and/or method 800 may be stored in the storage device 130 and/or the storage (e.g., the ROM 230, the RAM 240) as a form of instructions, and invoked and/or executed by the server 110 (e.g., the processing engine 112 in the server 110, or the processor 220 of the processing engine 112 in the server 110).

In 810, the processor 220 (e.g., the target link determination module 430) may obtain the level of the node. The processor 220 (e.g., the target link determination module 430) may obtain the level of the node from the level determination module 420.

In 820, the processor 220 (e.g., the target link determination module 430) may determine whether the level of the node is the first value (e.g., level 0). If the processor 220 determines that the level of the node is the first value, the process 800 may proceed to step 830. Otherwise, if the processor 220 determines that the level of the node is not the first value, the process and/or method 800 may proceed to step 840.

Since the node with a level corresponding to the first value may have the highest degree of influence on the user, in 830, the processor 220 (e.g., the target link determination module 430) may determine all of the one or more links connected to the node with the first value of level as the target links.

For the node whose level is not the first value, it may have a relatively lower degree of influence on the user in comparison with the node with a level of the first value, in 840, the processor 220 (e.g., the target link determination module 430) may determine one or more target links based on the one or more links connected to the node whose level is not the first value. Part of the information associated with the node may be presented to the user. In some embodiments, the processor 220 (e.g., the target link determination module 430) may determine a score for each of the one or more links connected to the node whose level is not the first value and determine one or more target links for the node based on the number of links connected to the node and/or scores of the links connected to the node. The determination of the target link associated with the node whose level is not the first value may be found in FIG. 9 and the description thereof in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. As another example, one or more other optional steps (e.g., a storing step, a preprocessing step) may be added elsewhere in the exemplary process/method 800. As still another example, all the steps in the exemplary process/method 800 may be implemented in a computer-readable medium including a set of instructions. The instructions may be transmitted in a form of electronic current or electrical signals.

Figure 9:
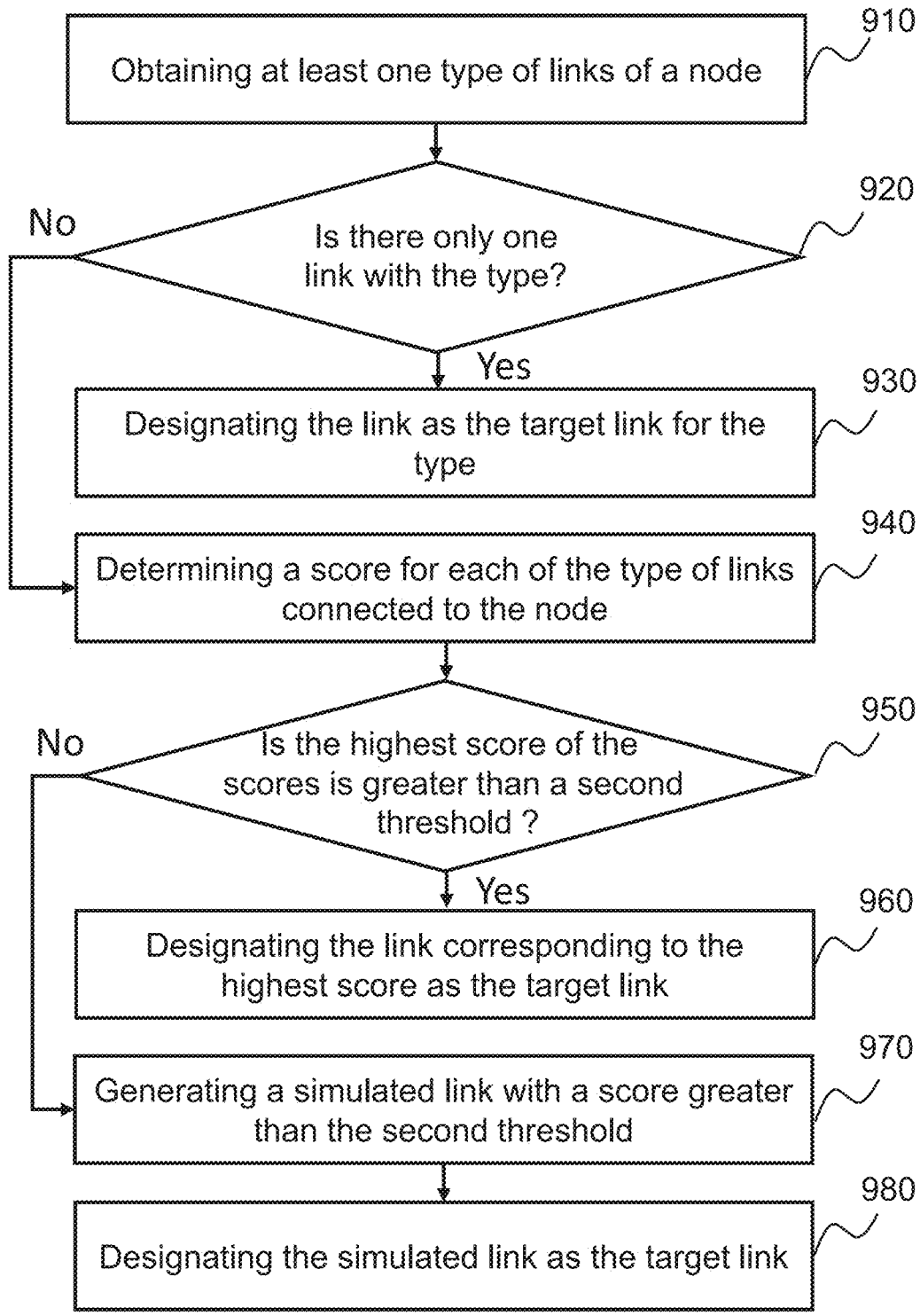
FIG. 9 is a flowchart of another exemplary process and/or method for determining one or more target links for a node according to some embodiments of the present disclosure.

FIG. 9 is a flowchart of an exemplary process and/or method 900 for determining a target link for the node whose level is not the first value according to some embodiments of the present disclosure. In some embodiments, the process and/or method 900 may be used to determine the target link in step 840 of the process and/or method 800. In some embodiments, one or more steps in the process and/or method 900 may be implemented in the system 100 illustrated in FIG. 1. For example, one or more steps in the process and/or method 900 may be stored in the storage device 130 and/or the storage (e.g., the ROM 230, the RAM 240) as a form of instructions, and invoked and/or executed by the server 110 (e.g., the processing engine 112 in the server 110, or the processor 220 of the processing engine 112 in the server 110).

In 910, the processor 220 (e.g., the target link determination module 430) may obtain the at least one type of links of the node. In some embodiments, the type of links may include a preceding link and a succeeding link. The processor 220 (e.g., the target link determination module 430) may obtain the at least one type of links of the node from the information obtaining module 410.

In 920, the processor 220 (e.g., the target link determination module 430) may determine whether there is only one link with the type. For each type, if there is only one link with the type connected to the node whose level is not the first value, the process and/or method 900 may proceed to step 930. In 930, the processor 220 (e.g., the target link determination module 430) may designate the one link as the target link for the type. For example, if the level of a node is not the first value (e.g., the level of the node is level 1) and there is only one preceding link connected to the node, the processor 220 may designate the preceding link as the target link for the type (also referred to herein as "target preceding link"). Otherwise, if there is more than one link with the type connected to the node whose level is not the first value, the process and/or method 900 may proceed to step 940. In 940, the processor 220 (e.g., the target link determination module 430) may determine a score for each of the type of links connected to the node. For example, if the level of a node is not the first value (e.g., the level of the node is level 1) and there is more than one preceding link (e.g., three preceding links) connected to the node, the processor 220 may determine a score for each of the three preceding links and determine the target preceding link based on the scores of the three preceding links.

In some embodiments, the score may be an evaluation value for a link. The higher the score is, the higher the probability of the link corresponding to the score is determined to be a target link. In some embodiments, the processor 220 may determine a score of a link based on a relationship between the link and a reference link. The reference link may refer to a link that has been determined to be a target link associated with a node. To determine a target succeeding link of a node whose level is not the first value, the processor 220 may determine a preceding link that has been determined to be a target link (a target preceding link) of the node as a reference link. In some embodiments, the processor 220 may determine a score of a link based on the internal attributes of the road or road segment corresponding to the link (e.g., the name of the road, the level of the road, the width of the road), and/or an angle between the link and a reference link. For example, referring to FIG. 11, for node 1150, there are two succeeding links L8 and L9, there is one preceding link L7, the level of node 1120 is the first value, the level of node 1150 is not the first value, the processor 220 determines links L3 and L7 as the target succeeding links associated with node 1120. Therefore, to determine the scores of the links L8 or L9, the processor 220 may determine link L7 as a reference link.

The determination of a score of a proceeding link of a node is similar to the determination of a score of a succeeding link of a node. For illustration purpose, take determining a score of a succeeding link of a node as an example. In some embodiments, the processor 220 may determine a score P for a succeeding link connected to a node according to equation (1):

$$P=100+n \times l \times \text{levelWeight} + w \times \text{widthWeight} - |\text{angle}_1| - |\text{angle}_2| \quad (1),$$

wherein n denotes a value that may be 0 or 1. If the name of the road segment corresponding to the succeeding link is the same as the name of the reference road segment corresponding to the reference link, n may be determined as 1; otherwise, n may be determined as 0. l denotes a value that may be 0 or 1. If the level of the road segment corresponding to the succeeding link is the same with the level of the reference road segment corresponding to the reference link, l may be determined as 1; otherwise, l may be determined as 0. The level of the road segment may be an internal attribute of the road segment, such as but not limited to a highway, urban expressway, national road, provincial road, county road, township road, nine grade road, ferry, pedestrian road, or the like, or any combinations thereof. levelWeight denotes a weighted value of the name and the level of the road segment corresponding to the succeeding link. w denotes a value that may be 0 or 1. If the width of the road segment corresponding to the succeeding link is the same as the width of the reference road segment corresponding to the reference link, w may be determined as 1; otherwise, w may be determined as 0. widthWeight denotes a weighted value of the width of the road segment corresponding to the succeeding link. $\text{angle}_1$ denotes a geometric angle value between the succeeding link and the reference link. $\text{angle}_2$ denotes a geometric angle value between the succeeding link and the reference link after extending back for a certain distance (e.g., 10, 20, 50, or 100 meters) from the node connected to the succeeding link and the reference link.

In some embodiments, the value of levelWeight and/or widthWeight may be a value between 0 and 100. The sum of levelWeight and widthWeight may be 100. The processor 220 may assign the value for levelWeight and/or widthWeight based on the names, the levels, and/or the widths of the road or road segments corresponding to the succeeding link and the reference road segment corresponding to the reference link. For example, if the names, the levels, and the widths of the road segment corresponding to the link and the reference road segment corresponding to the reference link are the same, respectively, the values of levelWeight and widthWeight may be assigned as 50 and 50, respectively. As another example, if the name or the level of the road segment corresponding to the link is different from the name or the level of the reference road segment corresponding to the reference link and the width of the road segment corresponding to the link is the same as the width of the reference road segment corresponding to the reference link, the value of levelWeight and widthWeight may be assigned as 20 and 80, respectively. As still another example, if the name and the level of the road segment corresponding to the link are the same as the name and the level of the reference road segment corresponding to the reference link, respectively, and the width of the road segment corresponding to the link is different from the width of the reference road segment corresponding to the reference link, the value of levelWeight and widthWeight may be assigned as 30 and 70, respectively. It should be noted that the values of levelWeight and widthWeight may be adjusted according to the different situations of the system and similar modifications are within the scope of the discourse.

In 950, the processor 220 (e.g., the target link determination module 430) may determine whether the highest score of the scores from 940 is greater than a second threshold. In some embodiments, the processor 220 may rank the scores in descending order or ascending order and determine the highest score based on the ranking result. The second threshold may be a preset score value stored in the system, for example, 50, or may be determined according to different applications scenarios. In some embodiments, if the highest score is greater than the second threshold, the process and/or method 900 may proceed to step 960. If the highest score is not greater than the second threshold, the processor 220 may not determine a target link with the type for the node, or the process and/or method 900 may proceed to step 970.

In 960, the processor 220 (e.g., the target link determination module 430) may designate the link corresponding to the highest score as the target link. In some embodiments, there may be one or more links with the highest score. The processor 220 may designate all or part of the one or more links as the target links.

In some embodiments, if the highest score is not greater than the second threshold, it may mean that there is a great difference (e.g., a great angle) between the reference link and any one of the preceding links or succeeding links of a node. The processor 220 may not determine a target link for the node based on the scores. In some embodiments, to make the road map presented to the user complete and/or beautiful, in 970, the processor 220 (e.g., the target link determination module 430) may generate a simulated link with a score greater than the second threshold.

In some embodiments, the simulated link may correspond to a road segment (also referred to herein as a simulated road segment) with attributes that ensure the score of the simulated link is greater than the second threshold. The simulated road segment corresponding to the simulated link may not actually exist in the real world. The processor 220 may construct a simulated road segment corresponding to the simulated link with the same name, level, and/or width with the reference road segment corresponding to the reference link. The simulated road segment corresponding to the simulated link may be located in the same straight line with the reference road segment corresponding to the reference link. In some embodiments, the processor 220 may generate the simulated link along the direction of the reference link of the node, and the attributes of the simulated road segment corresponding to the simulated link may be arbitrarily adjusted only to ensure that the score determined according to equation (1) is greater than the second threshold.

In 980, the processor 220 (e.g., the target link determination module 430) may designate the simulated link as the target link.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. As another example, one or more other optional steps (e.g., a storing step, a preprocessing step) may be added elsewhere in the exemplary process/method 900. As still another example, all the steps in the exemplary process/method 900 may be implemented in a computer-readable medium including a set of instructions. The instructions may be transmitted in a form of electronic current or electrical signals.

Figure 10A:
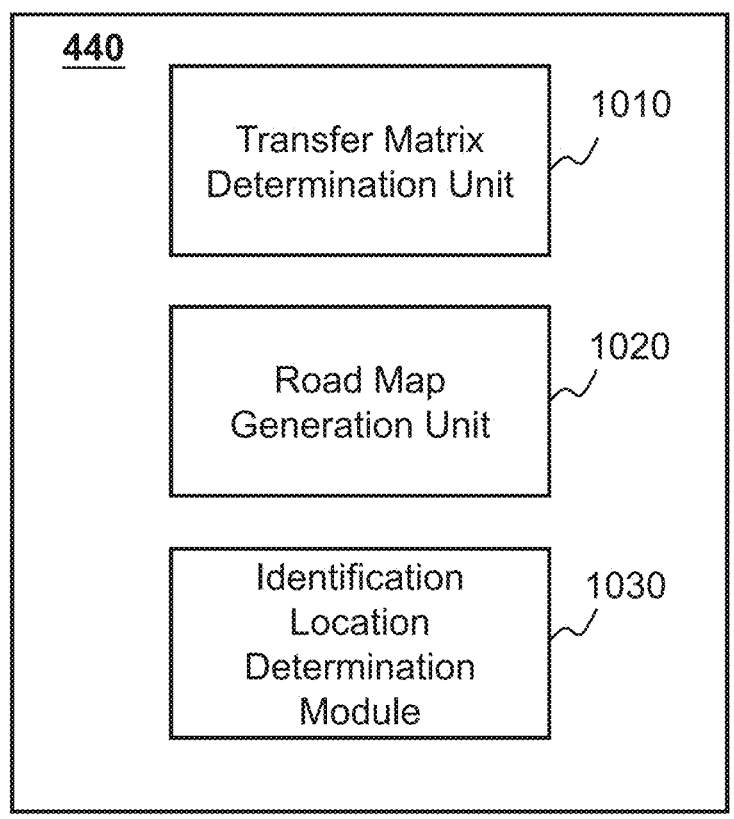
FIG. 10A is a block diagram illustrating an exemplary road map generation module according to some embodiments of the present disclosure.

FIG. 10A is a block diagram illustrating an exemplary road map generation module 440 according to some embodiments. The road map generation module 440 may include a transfer matrix determination unit 1010, a road map generation unit 1020, and an identification location determination unit 1030. The units may be hardware circuits of all or part of the road map generation module 440. The units may also be implemented as an application or set of instructions read and executed by the processing engine. Further, the units may be any combination of the hardware circuits and the application/instructions. For example, the units may be the part of the processing engine 112 when the processing engine is executing the application/set of instructions.

The transfer matrix determination unit 1010 may determine a transfer matrix. In some embodiments, the transfer matrix may be related to the current location of the navigation terminal 120. In certain embodiments, the transfer matrix determination unit 1010 may determine the transfer matrix by a map matching algorithm. The map matching algorithm may include a deterministic map matching algorithm and/or a non-deterministic map matching algorithm. The deterministic map matching algorithm may include a projection matching algorithm, or the like. The non-deterministic map matching algorithm may include a probabilistic statistics algorithm, a fuzzy logic algorithm, a correlation analysis algorithm, a D-S based evidence reasoning algorithm, or the like, or any combination thereof.

The road map generation unit 1020 may generate a road map. In some embodiments, the road map generation unit 1020 may generate the road map based on the transfer matrix and the target links of the node.

The identification location determination unit 1030 may determine an identification location of the navigation terminal 120 on the road map. In some embodiments, the identification location determination unit 1030 may determine the identification location based on the current location of the navigation terminal 120 and the transfer matrix. In some embodiments, the identification location determination unit 1030 may set an identification of the navigation terminal 120 on the identification location.

Figure 10B:
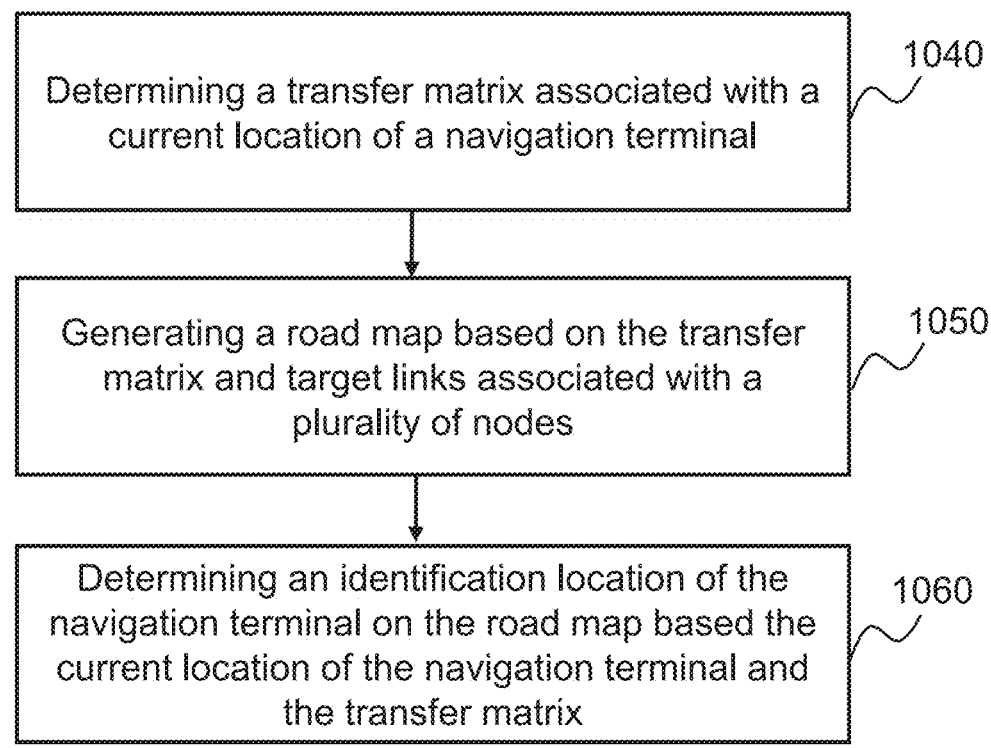
FIG. 10B is a flowchart of an exemplary process and/or method for generating a road map according to some embodiments of the present disclosure.

FIG. 10B is a flowchart of an exemplary process and/or method 1000 for generating the road map according to some embodiments of the present disclosure. In some embodiments, one or more steps in the process and/or method 1000 may be implemented in the system 100 illustrated in FIG. 1. For example, one or more steps in the process and/or method 1000 may be stored in the storage device 130 and/or the storage (e.g., the ROM 230, the RAM 240) as a form of instructions, and invoked and/or executed by the server 110 (e.g., the processing engine 112 in the server 110, or the processor 220 of the processing engine 112 in the server 110).

In 1040, the processor 220 (e.g., the transfer matrix determination unit 1010 of the road map generation module 440) may determine a transfer matrix associated with the current location of the navigation terminal.

In some embodiments, the transfer matrix may be a matrix that indicates a mapping relationship of a stereoscopic space and an image coordinate. The transfer matrix may include a translation matrix, a scaling matrix, a rotation matrix, a symmetric matrix, or the like, or any combination thereof. In some embodiments, each of the node may be associated with a transfer matrix. The transfer matrix may be used to transform the intersections corresponding to the nodes and the related objects (e.g., the target road segments corresponding to the target links of the nodes) into the road map.

In some embodiments, the transfer matrix may be stored in the storage device 130 of the system 100 in advance. The processor 220 may obtain the transfer matrix by accessing the storage device 130 via the network 140. In some embodiments, the transfer matrix may be determined based on the actual scenario of the intersection corresponding to the node and a map matching algorithm. For example, the map matching algorithm may include a deterministic map matching algorithm and/or a non-deterministic map matching algorithm. The deterministic map matching algorithm may include a projection matching algorithm, or the like. The non-deterministic map matching algorithm may include a probabilistic statistics algorithm, a fuzzy logic algorithm, a correlation analysis algorithm, a D-S based evidence reasoning algorithm, or the like, or any combination thereof.

In 1050, the processor 220 (e.g., the road map generation unit 1020 of the road map generation module 440) may generate the road map based on the transfer matrix and the target links.

Figure 14:
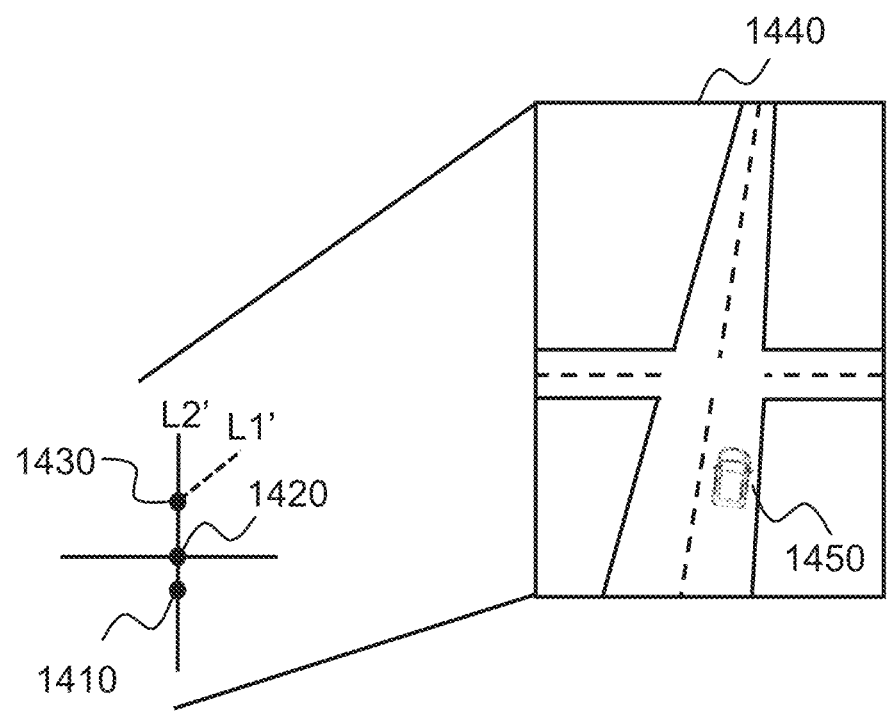
FIG. 14 illustrates an exemplary road map according to some embodiments of the present disclosure.

The road map may be used to help the user to drive his or her vehicle along the navigation route. The road map may be a two-dimensional image, a three-dimensional image, etc. The road map may include a plurality of intersections corresponding to the plurality of nodes, a plurality of road segments corresponding to the target links. In some embodiments, the processor 220 may obtain space coordinates of the intersection corresponding to the node and the related objects (e.g., the target road segments corresponding to the target links of the node) and may further determine a space matrix associated with the space coordinates. In some embodiments, each element of the space matrix may correspond to a point in the road network. Then the processor 220 may determine the road map based on the space matrix and the transfer matrix. For example, the processor 220 may multiply the transfer matrix by the space matrix to determine the road map. Referring to FIG. 14, FIG. 14 illustrates an exemplary road map according to some embodiments of the present disclosure. As shown in FIG. 14, the road map 1440 may include the node 1420, the node 1430, the target links of the node 1420, and the target link of the node 1430 (e.g., the link L2'). Because the link L1' is determined as a non-target link, the link L1' may not be presented in the road map 1440.

In 1060, the processor 220 (e.g., the identification location determination unit 1030 of the road map generation module 440) may determine an identification location of the navigation terminal 120 on the road map based on the current location of the navigation terminal 120 and the transfer matrix.

In some embodiments, the identification location may be used to reflect the location of the navigation terminal 120 in the road map precisely. The processor 220 may determine the identification location in the road map by multiplying space coordinates of the location of the navigation terminal 120 by the transfer matrix. In some embodiments, the identification location of the navigation terminal 120 may be changed in real time. The processor 220 may obtain the locations of the navigation terminal 120 and update the space coordinates of the locations at a regular time interval, for example, 0.5 second, 1 second, 2 seconds, 3 seconds, 4 seconds, or 5 seconds. The processor 220 (e.g., the identification location determination unit 1030 of the road map generation module 440) may re-determine the identification location after the regular time interval. In some embodiments, an identification of the navigation terminal 120 may be set on the identification location. The identification may be in any format such as an icon, a dot, an arrow, etc. As shown in FIG. 14, the identification 1450 may set on the identification location corresponding to the location of the navigation terminal 1410 to represent the navigation terminal 1410.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the process 1000. As another example, all the steps in the process 1000 may be implemented in a computer-readable medium including a set of instructions. The instructions may be transmitted in a form of electronic current or electronic signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A remote navigation device configured to communicate with a navigation terminal, comprising:
  at least one storage medium including a set of instructions for generating a road map; and
  at least one processor in communication with the storage medium, wherein when executing the set of instructions, the at least one processor is directed to:
    obtain a navigation route for the navigation terminal and a current location of the navigation terminal;
    obtain road network data associated with the current location of the navigation terminal based on the navigation route and the current location of the navigation terminal, wherein the road network data includes a plurality of links and a plurality of nodes, wherein each of the plurality of nodes is connected to one or more links, the one or more of links including at least one type of links;
    determine a level for each of the plurality of nodes;
    for each of the plurality of nodes, determine one or more target links for the at least one type of links connected to the node based on the level of the node; and generate a road map based on the target links, wherein to determine the one or more target links for one type of links connected to the node based on the level of the node, the at least one processor is further directed to:
    determine whether the level of the node is the first value; and
    in response to the determination that the level of the node is the first value, determine all of the type of links connected to the node as the target links.

2. The remote navigation device of claim 1, wherein to determine the level for each of the plurality of nodes, the at least one processor is further directed to:
  obtain nodes on the navigation route from the plurality of nodes;
  designate a node from the nodes on the navigation route as a reference node;
  for each of the nodes on the navigation route, determine a level of the node based on a distance between the node and the reference node;
  obtain nodes not on the navigation route from the plurality of nodes; and
  for each of the nodes not on the navigation route, determine a level of the node based on the level of the node on the navigation route and a topology relationship relating to the plurality of nodes.

3. The remote navigation device of claim 2, wherein for each of the nodes on the navigation route, to determine the level of the node based on the distance between the node and the reference node, the at least one processor is further directed to:
  determine whether the distance between the node and the reference node is greater than a first threshold;
  in response to the determination that the distance between the node and the reference node is smaller than or equal to the first threshold, determine the level of the node as a first value; and
  in response to the determination that the distance between the node and the reference node is greater than the first threshold, determine the level of the node as a second value.

4. The remote navigation device of claim 1, wherein the levels of two nodes of the plurality of nodes connected by an internal link, a roundabout link, or a short link are the same.

5. The remote navigation device of claim 1, wherein to determine the one or more target links for one type of links connected to the node based on the level of the node, the at least one processor is further directed to:
  determine whether the level of the node is the first value; and
  in response to the determination that the level of the node is not the first value, determine whether there is only one link with the type;
  in response to the determination that there is only one link with the type, designate the link as the target link for the type;
  in response to the determination that there is not only one link with the type, determine a score for each of the type of links connected to the node; and
determine a target link based on the scores relating to the type of links connected to the node.

6. The remote navigation device of claim 5, wherein to determine the target link based on the scores relating to the type of links, the at least one processor is further directed to:
  determine whether the highest score of the scores is larger than a second threshold; and
  in response to the determination that the highest score is larger than the second threshold, designate the link corresponding to the highest score as the target link for the type.

7. The remote navigation device of claim 6, wherein to determine the target link based on the scores relating to the type of links, the at least one processor is further directed to:
  in response to the determination that the highest score is small than or equal to the score threshold,
  generate a simulated link with a score greater than the second threshold; and
  designate the simulated link as the target link for the type.

8. The remote navigation device of claim 1, wherein to generate the road map based on the target links, the at least one processor is further directed to:
  determine a transfer matrix associated with the current location of the navigation terminal; and
  generate the road map based on the transfer matrix and the target links.

9. The remote navigation device of claim 1, wherein the at least one processor is further directed to:
  determine an identification location of the navigation terminal on the road map based the location of the navigation terminal and the transfer matrix, wherein an identification of the navigation terminal is set on the identification location.

10. A method generating a road map implemented on a computing device having at least one processor, at least one storage medium, and a communication platform connected to a network, comprising:
  obtaining a navigation route for a navigation terminal and a current location of the navigation terminal;
  obtaining road network data associated with the current location of the navigation terminal based on the navigation route and the current location of the navigation terminal, wherein the road network data includes a plurality of links and a plurality of nodes, wherein each of the plurality of nodes is connected to one or more links, the one or more of links including at least one type of links;

determining a level for each of the plurality of nodes;

for each of the plurality of nodes, determining one or more target links for the at least one type of links connected to the node based on the level of the node; and generating a road map based on the target links; wherein determining the one or more target links for one type of links connected to the node based on the level of the node includes:

determining whether the level of the node is the first value; and in response to the determination that the level of the node is the first value, determining all of the type of links connected to the node as the target links.

11. The method of claim 10, wherein determining the level for each of the plurality of nodes includes:

obtaining nodes on the navigation route from the plurality of nodes;

designating a node from the nodes on the navigation route as a reference node;

for each of the nodes on the navigation route, determining a level of the node based on a distance between the node and the reference node;

obtaining nodes not on the navigation route from the plurality of nodes; and for each of the nodes not on the navigation route, determining a level of the node based on the level of the node on the navigation route and a topology relationship relating to the plurality of nodes.

12. The method of claim 11, wherein for each of the nodes on the navigation route, determining the level of the node based on the distance between the node and the reference node includes:

determining whether the distance between the node and the reference node is greater than a first threshold;

in response to the determination that the distance between the node and the reference node is smaller than or equal to the first threshold, determining the level of the node as a first value; and in response to the determination that the distance between the node and the reference node is greater than the first threshold, determining the level of the node as a second value.

13. The method of claim 10, wherein determining the one or more target links for one type of links connected to the node based on the level of the node includes:

determining whether the level of the node is the first value; and in response to the determination that the level of the node is not the first value, determining whether there is only one link with the type;

in response to the determination that there is only one link with the type, designating the link as the target link for the type;

in response to the determination that there is not only one link with the type, determining a score for each of the type of links connected to the node; and determining a target link based on the scores relating to the type of links connected to the node.

14. The method of claim 13, wherein determining the target link based on the scores relating to the type of links includes:

determining whether the highest score of the scores is larger than a second threshold; and in response to the determination that the highest score is larger than the second threshold, designating the link corresponding to the highest score as the target link for the type.

15. The method of claim 14, wherein determining the target link based on the scores relating to the type of links includes:

in response to the determination that the highest score is small than or equal to the score threshold, generating a simulated link with a score greater than the second threshold; and designating the simulated link as the target link for the type.

16. The method of claim 10, wherein generating the road map based on the target links includes:

determining a transfer matrix associated with the current location of the navigation terminal; and generating the road map based on the transfer matrix and the target links.

17. The method of claim 10, wherein the method further includes:

determining an identification location of the navigation terminal on the road map based the location of the navigation terminal and the transfer matrix, wherein an identification of the navigation terminal is set on the identification location.

* * * * *